(12) United States Patent
Simmons

(10) Patent No.: US 8,384,537 B1
(45) Date of Patent: Feb. 26, 2013

(54) VEHICLE OCCUPANT EMERGENCY COMMUNICATION APPARATUS

(76) Inventor: Omega R. Simmons, Jonesboro, LA (US)

(*) Notice: Subject to any disclaimer, the term of this patent is extended or adjusted under 35 U.S.C. 154(b) by 279 days.

(21) Appl. No.: 12/903,743

(22) Filed: Oct. 13, 2010

(51) Int. Cl.
*G08B 21/00* (2006.01)

(52) U.S. Cl. ........ 340/468; 340/471; 340/474; 180/272; 180/271

(58) Field of Classification Search ............... 340/425.5, 340/468, 471–474; 701/45; 180/271, 272
See application file for complete search history.

(56) References Cited

U.S. PATENT DOCUMENTS

| | | |
|---|---|---|
| 6,922,622 B2 | 7/2005 | Dulin et al. |
| 7,081,811 B2 | 7/2006 | Johnston et al. |
| 7,472,554 B2 | 1/2009 | Vosburgh |

*Primary Examiner* — Jeffery Hofsass

(57) ABSTRACT

The vehicle interior security apparatus ensures the security of living beings within the confines of an auto or other enclosure in which they might reside or temporarily reside. The apparatus importantly provides for automatic emergency alert as well as manually triggered emergency alert. The apparatus can therefore safely guard even animals, babies, and others unable to fend for themselves. The apparatus provides for power generation so that existing power, such as that of a vehicle, need not be fully relied upon. The solar grid can power the apparatus and can also recharge existing electrical systems as well as operate the apparatus. The apparatus provides multiple components for audio, visual, and airwave warnings.

8 Claims, 3 Drawing Sheets

VEHICLE OCCUPANT EMERGENCY COMMUNICATION APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

There exist various devices for attempting to ensure the safety of vehicle occupants when for some reason those occupants are trapped in a vehicle. Occupants may be trapped due to age limitations. Occupants may become trapped due to extreme temperature conditions. Occupants may even become trapped through the actions of others. Some devices provide for using existing ventilation systems to relieve temperature extremes. Some vehicles use existing communication devices within a vehicle in effort to signal for assistance. Some devices wire into a vehicle's electrical system to assist in unlocking locks, lowering windows or performing other functions. Most rely totally on the vehicle's existing power supply, a shortcoming that might cost a life. In short, of the various devices, none provide the security offered by the current apparatus in ensuring a vehicle occupant's safety.

FIELD OF THE INVENTION

The apparatus relates to vehicle interior security systems and devices.

SUMMARY OF THE INVENTION

The general purpose of the vehicle interior security apparatus, described subsequently in greater detail, is to provide a vehicle interior security apparatus which has many novel features that result in an improved vehicle interior security apparatus which is not anticipated, rendered obvious, suggested, or even implied by prior art, either alone or in combination thereof.

To attain this, the apparatus ensures the security of living beings within the confines of an auto or other enclosure in which they might reside or temporarily reside. The apparatus importantly provides for automatic emergency alert as well as manually triggered emergency alert. The apparatus can therefore safely guard even animals, babies, and others unable to fend for themselves. The apparatus provides for power generation so that existing power, such as that of a vehicle, need not be fully relied upon. The solar grid can power the apparatus and can also recharge existing electrical systems as well as operate the apparatus. The solar grid may importantly be about 1-2 inches in width to provide for installation around windshield perimeters, rear window perimeters, and other preferred locations.

The trim lighting is importantly about 1 inch in width as is experimentally determined to be least intrusive on vehicle and structure design while remaining highly visible from afar.

The apparatus provides a plurality of sensors for detecting interior noises over a particular adjustable dB setting, temperature extremes. Accessory blue lights are important in others recognizing an emergency situation.

A plurality of electronic components of the apparatus may be in wireless communication or in hard wired communication. The apparatus is optionally in communication with existing electronic components of a vehicle, components such as the vehicle horn, electric windows, and lights. The system may be in communication with an existing vehicle or structure such that door opening quiet all alarm features. The apparatus may take advantage of existing ventilation of a vehicle or other structure.

Each pad may be Braille equipped. Emergency communication may be two-way via each pad.

Thus has been broadly outlined the more important features of the improved vehicle interior security apparatus so that the detailed description thereof that follows may be better understood and in order that the present contribution to the art may be better appreciated.

An object of the vehicle interior security apparatus is to ensure the safety of anyone trapped within an enclosure such as a vehicle.

Another object of the vehicle interior security apparatus is to provide for alerting others.

A further object of the vehicle interior security apparatus is to provide for alerting emergency personnel of interiorly trapped living beings.

An added object of the vehicle interior security apparatus is to provide for automatically alerting emergency personnel of danger to interiorly trapped living beings.

Another object of the vehicle interior security apparatus is to provide for manually alerting emergency personnel of danger to interiorly trapped living beings.

And, an object of the vehicle interior security apparatus is to provide airwave, audio, and visual emergency alerts.

Yet another object of the vehicle interior security apparatus is to sense interior dangers via sound, temperature, and CO levels.

Still another object of the vehicle interior security apparatus is to provide solar power either separate or in combination with an existing vehicle or structure power.

And, an object of the vehicle interior security apparatus is to provide a solar grid of about 1-2 inches in diameter such that the grid may be installed around a perimeter of a vehicle windshield or the like.

These together with additional objects, features and advantages of the improved vehicle interior security apparatus will be readily apparent to those of ordinary skill in the art upon reading the following detailed description of presently preferred, but nonetheless illustrative, embodiments of the improved vehicle interior security apparatus when taken in conjunction with the accompanying drawings.

DETAILED DESCRIPTION OF THE DRAWINGS

With reference now to the drawings, and in particular FIGS. 1 through 6 thereof, the principles and concepts of the vehicle interior security apparatus generally designated by the reference number 10 will be described.

Figure 1:
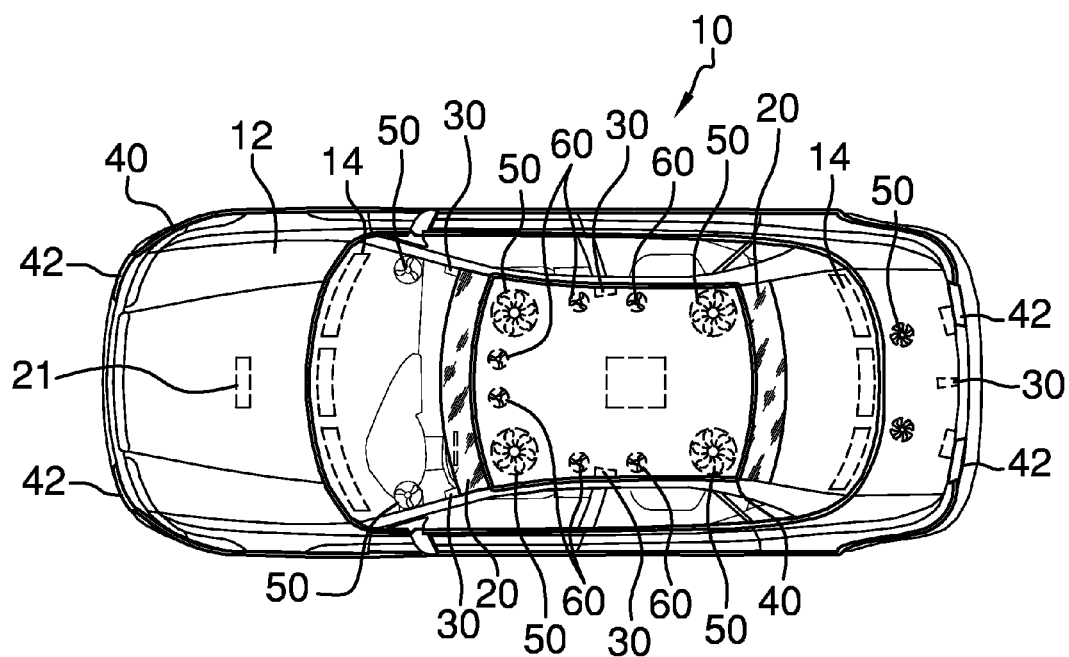
FIG. 1 is a top plan view of a vehicle fitted with the apparatus.

Referring to FIG. 1, the apparatus 10 partially comprises a plurality of pads 30 selectively disposed within the vehicle 12. A plurality of accessory blue lights 42 is installed on the vehicle 12, preferably as illustrated on front, rear, and roof. A plurality of ventilation fans 50 is installed throughout the vehicle 12 in strategic positions to best aid occupants, even if disposed in the trunk.

Figure 4:
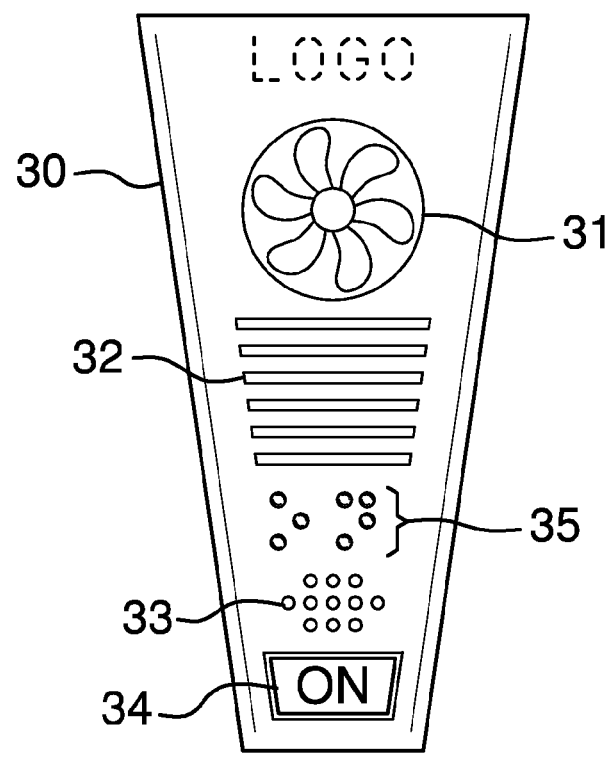
FIG. 4 is a top plan view of a pad of the apparatus.

Referring to FIG. 4, each pad 30 has airwave emergency communication capability so that emergency services such as police and ambulance can be alerted. The pads 30 comprise an on/off button 34, a speaker 33 for occupant communication with emergency services and others outside the vehicle 12.

Figure 5:
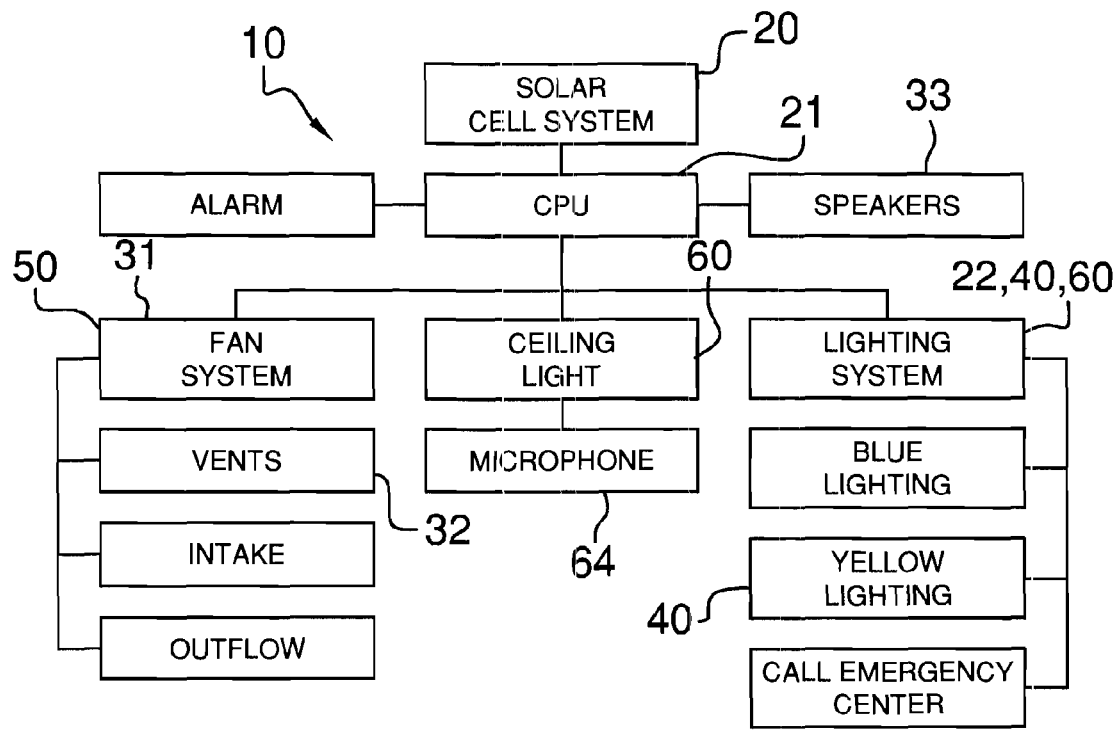
FIG. 5 is a schematic block diagram of intercommunicating components of the apparatus.

Referring to FIG. 5, the pads 30 also provide a Braille feature 35.

Referring again to FIG. 4, each pad 30 also comprises a pad fan 31 and vent 32. The vent 32 has within a CO sensor, an adjustable temperature sensor, and adjustable sound sensor (not shown).

Figure 2:
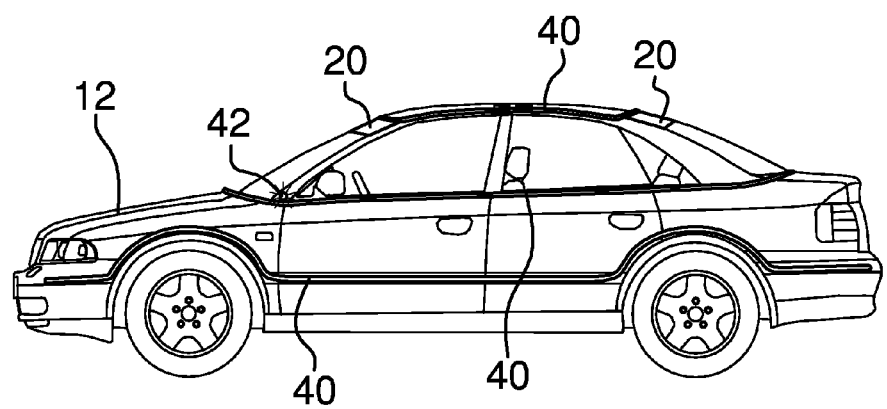
FIG. 2 is a lateral elevation view of a vehicle fitted with the apparatus.
Figure 3:
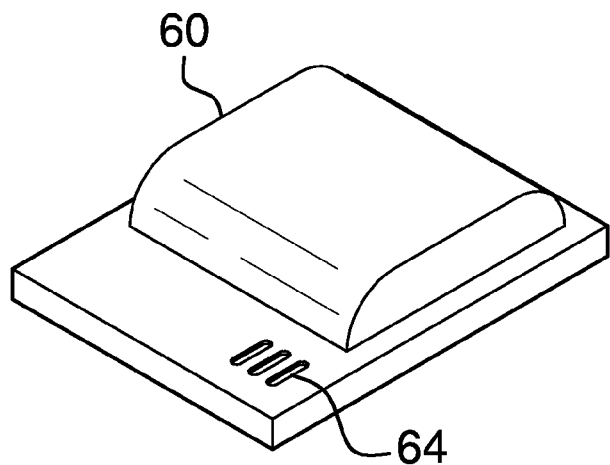
FIG. 3 is a perspective view of a remote light of the apparatus.

Referring to FIGS. 1 and 2, a solar cell grid 20 is affixed to the vehicle 12. The solar cell grid is about 1-2 inches in width and is therefore well suited to installation circumferentially on the windshield and rear window of the vehicle 12.

Referring to FIG. 5, the solar cell grid 20 is in communication with an existing electrical system of the vehicle 12.

Referring again to FIG. 1, a plurality of ventilation fans 50 is affixed in a spaced apart arrangement within the vehicle 12. A plurality of remote lights 60 is affixed within the vehicle 12. Each remote light 60 further comprises a microphone 64.

Referring again to FIG. 1, the apparatus 10 further comprises the trim lighting 40 affixed exteriorly to the vehicle 12 as to be visible from the top and from a plurality of elevations of the vehicle 12. The trim lighting 40 has a width of about 1 inch. The trim lighting 40 comprises blue and yellow lighting, and may be alternately applied as selected. The CPU 21 is disposed within the vehicle 12 as chosen.

Referring to FIGS. 1 and 5, the CPU 21 is in communication with each pad 30, each solar cell grid 20, the ventilation fans 50, the remote lights 60, the accessory blue lights 42, and the trim lighting 40. Operation of the apparatus 10 sees a manual depression of any pad 30 on/off 34, an excessive CO sensor level, an excessive noise sensor level, and a sensing of temperature beyond programmed ranges, and an alarming noise registered within any microphone 64 triggers emergency communication, trim lighting 40, pad fans 31, ventilation fans 50, accessory blue lights 42, and the remote lights 60.

Figure 6:
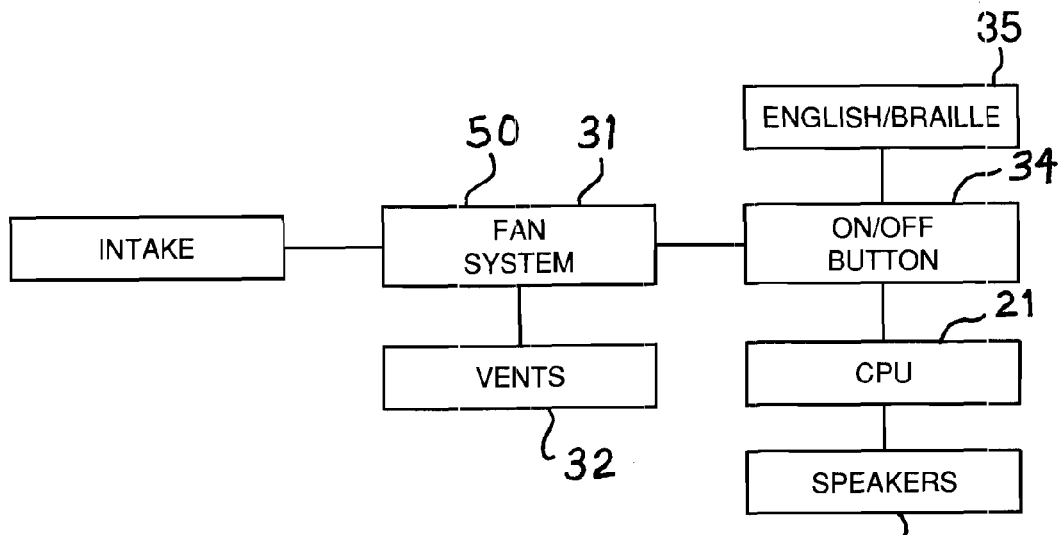
FIG. 6 is an alternate schematic block diagram embodiment.

Referring to FIG. 6, the alternate schematic block diagram provides example of the more basic alternate embodiment wherein the intake and fan system including ventilation fan 50 and pad fan 31 are in communication with the on/off 34. The Braille feature 35, on/off 34, and speakers 33 are in communication with the CPU 21.

What is claimed is:

1. A vehicle interior security apparatus comprising, in combination:
a plurality of pads selectively disposed within the vehicle, each pad having an airwave emergency communication capability, the pads comprising:
an on/off button;
a speaker;
a Braille feature;
a pad fan;
a vent, the vent having CO sensor, an adjustable temperature sensor, and adjustable sound sensor within;
a solar cell grid affixed to the vehicle, the solar cell grid in communication with an existing electrical system of the vehicle;
a plurality of ventilation fans affixed in a spaced apart arrangement within the vehicle;
a plurality of remote lights affixed within the vehicle, each remote light further comprising a microphone;
a trim lighting affixed exteriorly to the vehicle as to be visible from a top and from a plurality of elevations of the vehicle, the trim lighting comprising blue and yellow lighting;
a CPU disposed within the vehicle, the CPU in communication with each pad, the solar cell grid, the ventilation fans, the remote lights, and the trim lighting;
whereby a manual depression of any pad on/off, an excessive CO sensor level, an excessive noise sensor level, and a sensing of temperature beyond programmed ranges, and an alarming noise registered within any MIC triggers emergency communication, trim lighting, pad fans, ventilation fans, and the remote lights.

2. The apparatus according to claim 1 wherein the trim lighting further comprise a width of about 1 inch.

3. The apparatus according to claim 1 wherein the solar cell grid further comprises a width of about 1-2 inches.

4. The apparatus according to claim 2 wherein the solar cell grid further comprises a width of about 1-2 inches.

5. A vehicle interior security apparatus comprising, in combination:
a plurality of pads selectively disposed within the vehicle, each pad having an airwave emergency communication capability, the pads comprising:
an on/off button;
a speaker;
a Braille feature;
a pad fan;
a vent, the vent having CO sensor, an adjustable temperature sensor, and adjustable sound sensor within;
a solar cell grid affixed to the vehicle, the solar cell grid in communication with an existing electrical system of the vehicle;
a plurality of ventilation fans affixed in a spaced apart arrangement within the vehicle;
a plurality of remote lights affixed within the vehicle, each remote light further comprising a MIC;
a trim lighting affixed exteriorly to the vehicle as to be visible from a top and from a plurality of elevations of the vehicle, the trim lighting comprising blue and yellow lighting;
a plurality of spaced apart accessory blue lights installed on a front, a rear, and a roof of the vehicle;
a CPU disposed within the vehicle, the CPU in communication with each pad, the solar cell grid, the ventilation fans, the remote lights, the accessory blue lights, and the trim lighting;
whereby a manual depression of any pad on/off, an excessive CO sensor level, an excessive noise sensor level, and a sensing of temperature beyond programmed ranges, and an alarming noise registered within any microphone triggers emergency communication, trim lighting, pad fans, ventilation fans, and the remote lights.

6. The apparatus according to claim 5 wherein the trim lighting further comprise a width of about 1 inch.

7. The apparatus according to claim 5 wherein the solar cell grid further comprises a width of about 1-2 inches.

8. The apparatus according to claim 6 wherein the solar cell grid further comprises a width of about 1-2 inches.

* * * * *